June 7, 1949. H. FORD ET AL 2,472,291
STABILIZER
Filed July 15, 1944
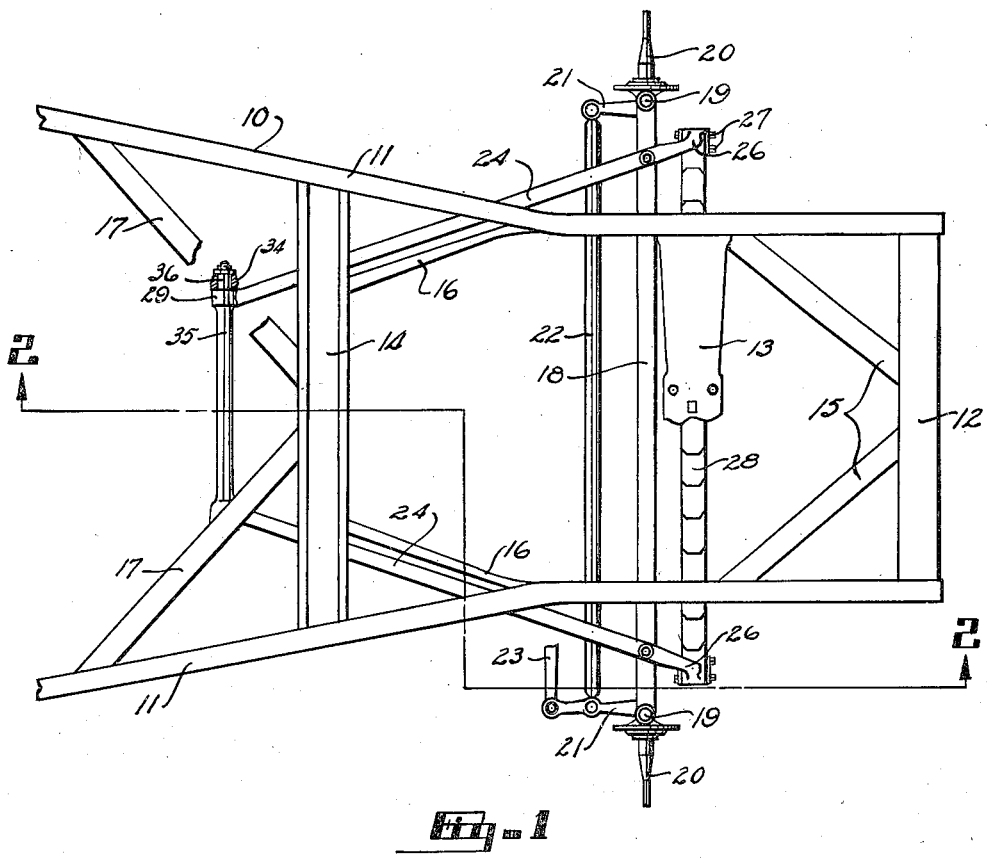
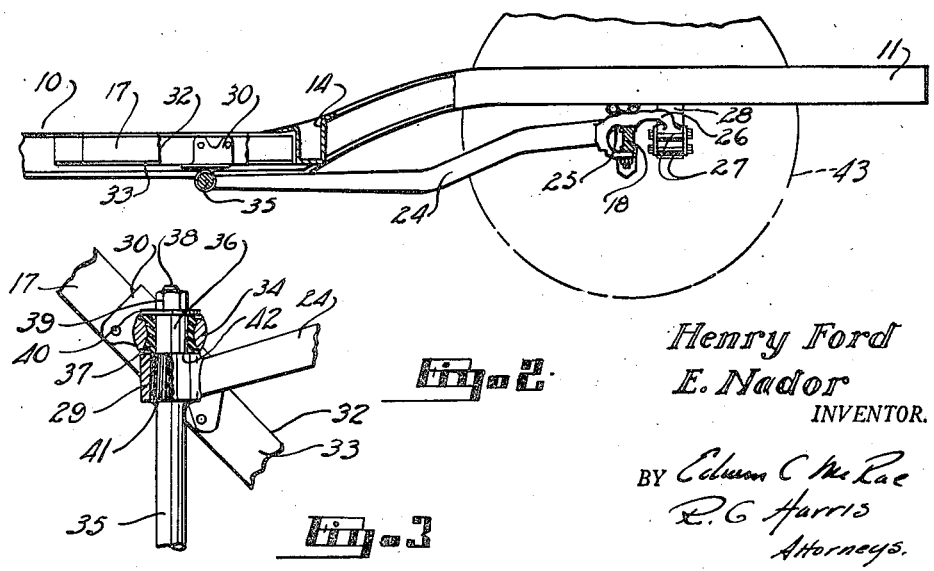
Henry Ford
E. Nador
INVENTOR.

Patented June 7, 1949

2,472,291

UNITED STATES PATENT OFFICE 2,472,291

STABILIZER

Henry Ford, Dearborn, and Emory Nador, Detroit, Mich., assignors to Ford Motor Company, Dearborn, Mich., a corporation of Delaware Application July 15, 1944, Serial No. 545,198

6 Claims. (Cl. 267—66)

The present invention relates to the construction of automotive vehicle chassis; and, more particularly, to stabilizing or roll-check apparatus applied to such chassis.

While this present device is shown in a particular application employing transverse springs, it has advantages as well when used with the other conventional types of spring construction. The principal advantage of the present construction is that the torsional resistance of the axle itself, in a large measure, supplies the torsional resistance required in the stabilizer construction. The stabilizer or torsion bar to prevent undue roll of automotive vehicles has been widely used in prior automotive production. However, in the usual construction, the torsion bar is a separate and unco-ordinated element and, as a result, substantially the entire resistance to rolling is provided by its torsional resistance alone. In the present construction, the axle and radius rods are integrated with the torsion bar; and the high degree of torsional resistance of the axle, as such, is utilized to impress a stabilizing effect on the vehicle. This not only gives a superior stabilizing effect but simplifies the method of attachment of the torsion bar as well and reduces to a marked degree the number of parts required in the construction. Other advantages will be apparent from the full description of the device.

The purpose, therefore, of this invention is to devise a novel stabilization or roll-check means employing both a torsion bar and the inherent resistance of the axle itself as a means of controlling roll of the vehicle body. Another object is to integrate the stabilizing means with a radius rod supporting axle. Another purpose is to devise a mounting for the torsion bar, as such, which is not subject to deterioration on use resulting in undesirable noise. Another purpose is to devise a stabilizing means having particular application with the use of transverse springs and minimizing the inherent tendency to roll encountered when such springs are used. Another purpose is to devise a simplified torsion-bar mounting requiring a minimum of parts and a general scheme of construction employing the minimum weight of metal in proportion to the stabilization achieved.

With these and other objects in view, the invention consists in the arrangement, construction, and combination of the various parts of the improved device, described in the specification, claimed in the claims, and illustrated in the accompanying drawings in which:

Figure 1 is a plan view of the forward portion of an automotive frame and attached running gear showing the installation of the stabilizing device.

Figure 2 is an elevation of the same portion of the frame taken as shown by the line 2—2 on Figure 1.

Figure 3 is a bottom plan view on an enlarged scale showing the method of attachment of the torsion bar to the frame member.

Referring to Figure 1, 10 indicates generally a vehicle frame having side members 11, a front cross member 12, a spring supporting cross member 13 and an intermediate cross member 14. Pairs of forward diagonal members 15, intermediate forwardly directed diagonal member 16 and intermediate rearwardly directed diagonal member 17, complete the front portion of the frame 10. An axle 18 has a steering knuckle 19 at each end thereof pivotally supporting the conventional wheel spindles 20. Steering arms 21 are forged integrally with each knuckle 19 and a tie rod 22 interconnects the rear ends of these arms in the usual manner. A drag link 23 extends between the free end of the off steering arm 21 and a conventional steering mechanism usually mounted on the frame but not shown in this drawing.

A pair of diagonal radius rods 24 have jaws 25 adjacent the forward end adapted to be bolted to the axle 18 to secure it at the desired caster angle. The radius rods 24 then continue to form a spring perch 26, which supports the spring shackles 27 at the ends of the transverse spring 28. The rods 24 extend rearwardly and terminate in internally splined collars 29. The torsion bar supporting brackets 30, generally L shaped in section, are bolted to the web 32 and lower flange 33 on the outer surface of each member 17. These brackets include an integral depending eye 34, which is substantially lozenge shaped in section. The torsion bar 35 has a circular section 36 adjacent each end received in the respective eyes 34 and supported therein by the rubber bushing 37. The extreme ends 38 of the torsion bar 35 are threaded and the bar 35 is rotatably secured in place in the eyes by a nut 39 and the washer 40 acting against an extruded portion of the rubber bushing 37. Inwardly of the circular section there is a coned and splined section of increased diameter indicated at 41 cooperating with the similarly formed internally splined collar 29 on the radius rod. The outer face 42 of the collar is, in effect, a shoulder bearing against an extruded portion of the rubber bushing 37. It will thus be seen that the torsion bar as mounted is resiliently restrained by either lateral or transverse movement through the intermediary of the rubber bushing and that there is no metal to metal contact except the relatively immovable attachment through the splines in the collar and on the coned section of the rod.

The method of operation and its particular advantage should now be apparent. Due to the method of mounting the torsion bar and radius rods, it will be seen that when one front wheel 43 rises, the restraint imposed by the radius rod, which is of substantial section as compared with the axle, will necessitate a torsional deflection of the axle itself as well as of the torsion bar 35. The stabilizing effect is then divided between the torsional resistance of the axle and of the torsion bar. With the particular axle under consideration, it has been established that there may be a torsional deflection upwards of 40 degrees without the possibility of a permanent set, and it is at once apparent that a considerable degree of torsional resistance can be obtained without an increase of metal in the torsion bar itself merely by relying upon the inherent torsional resistance of the axle. At the same time, the lateral movement of the car or the body is restricted through the effect imposed on the frame by the torsion-bar mounting. It is, of course, essential that the radius rods be of substantial section not only to perform their prime function in bracing the axle with respect to the frame, but to cause torsional deflection of the axle itself when the front wheels of the vehicle are at different elevations. It will be recognized that the installation in its simplest form is a locked linkage in which relative change in position at any one corner can be obtained only by deflection of one or more of the link members. Since the two rear corners are fixed and the radius rods are purposely of such section as to resist torsional and linear deflection, it follows that compensation is obtained through torsional deflection divided between the torsion bar and the axle and these elements can be so proportioned as to obtain any desired percentage of stress in each member. As stated above, a substantial amount of this load can be concentrated on an axle without danger of permanent distortion.

This is not the only advantage accruing; another principal one being that the torsion bar is mounted on the frame in a position in which the frame's rigidity, due to the crossbar construction, is best adapted to resist the forces imposed. The conventional forward extending stabilizing construction is usually mounted at the very front of the frame which does not usually possess this characteristic. Here, however, the torsion bar mounting is carried well back and adjacent cross members, at which the resistance of the frame is at a maximum. The applicants are aware that proposals have been made in the past to mount a stabilizing torsion bar rearwardly, as well as forwardly of the axle. It should be emphasized, however, that the present arrangement is not merely a torsion bar mounting, but rather an integrated construction between torsion bar and axle through the intermediary of the radius rods by means of which the forces, incident to differential elevations of the front wheels, are resisted both by the axle and the torsion bar rather than solely by the torsion bar as was always contemplated in the earlier constructions.

It was noted above that the present construction has particular application when transverse springs are used, since it is an inherent characteristic of this construction that the frame tends to rock around the center point of the spring as the vehicle goes around a curve. It will be understood that the center of gravity to the frame and the body are inevitably higher than the point of attachment of the spring; and, consequently, transverse forces exerted upon the body cause the body and frame to tip. In extreme cases these forces may cause the frame and body to shift laterally as a unit. The spring shackles necessarily must permit a limited lateral freedom and this sometimes results in an adverse effect upon the steering linkage. However, here the stabilizer also serves the purpose of centering and maintaining the frame while preventing the rocking motion. This will be apparent from the operation of the stabilizer mounting, which inhibits lateral movement of the radius rods and hence of the axle; and it will be noted that the restraining effect is exerted well towards the center of the car so that the over-all resistance to rocking is even greater than when a front-mounted stabilizer is used.

Some changes may be made in the arrangement, construction and combination of various parts of the improved device without departing from the spirit of this invention. It is the intention to cover by the claims such changes as may be reasonably included within the scope thereof.

The invention claimed is:

1. In a stabilizer for a motor vehicle having a frame and a transverse axle, comprising, substantially straight rigid radius rods having their front ends fixedly secured to said axle adjacent opposite ends thereof and extending diagonally rearwardly and inwardly a substantial distance therefrom, a transverse torsion bar, the rear ends of said rods being rigidly secured to opposite ends of said transverse torsion bar for rotation therewith, and said torsion bar being journaled on said frame adjacent the connection of said rods to said bar and secured against substantial longitudinal movement with respect thereto.

2. A stabilizer for a motor vehicle having a frame and a transverse axle, comprising, rigid radius rods having their front ends fixedly secured to said axle adjacent opposite ends thereof and extending diagonally rearwardly and inwardly a substantial distance therefrom, a transverse torsion bar, the rear ends of said rods being rigidly secured to opposite ends of said transverse torsion bar for rotation therewith, said torsion bar being rotatably mounted on said frame and resiliently secured against substantial longitudinal movement with respect thereto, the points of engagement of the mounting on said bar being immediately adjacent the points at which said radius rods are secured thereto.

3. A stabilizer for a motor vehicle having a frame and a transverse axle, comprising, rigid radius rods having their front ends fixedly secured to said axle adjacent opposite ends thereof and extending rearwardly a substantial distance therefrom and diagonally inwardly, the rear ends of said rods being rigidly secured adjacent the opposite ends of a transverse torsion bar for rotation therewith, said torsion bar being rotatably mounted on said frame adjacent each end of said bar, said mounting means comprising sleeves fixed to said frame at transversely spaced locations thereon adapted to receive the opposite ends of said torsion bar, a resilient bushing interposed between said sleeve and said torsion bar, means to limit the longitudinal movement of said torsion bar with respect to said sleeves, said resilient means being interposed as well between said limiting means and said sleeve and between said radius rod and said sleeve.

4. The structure of claim 3 which is further characterized in that the rearward ends of said radius rods are provided with an internally splined sleeve co-operating with a similarly splined surface on said torsion bar, the side of said rod affording a shoulder for locating said rod with respect to said first-named sleeve.

5. In a front end construction for a motor vehicle having a frame with substantially longitudinally extending side members resiliently supported on a transverse axle, comprising, a pair of rigid radius rods intersecting and secured to said axle for movement therewith adjacent opposite ends thereof, said rods extending rearwardly a substantial distance and diagonally inwardly, said rods terminating forwardly of said axle in spring perches, spring means interposed between said spring perches and said axle, a transversely arranged bar supported at each end in journals on said frame rearwardly of said axle, the rear ends of said rods being fixed for rotation with said bar adjacent the respective ends thereof, said journals including resilient bushings insulating said bar from said frame.

6. The structure of claim 5 which is further characterized in that the rear ends of said radius rod are provided with an internally splined sleeve cooperating with a similarly splined surface spaced inwardly from each end of said bar, bearing surfaces on said bar outwardly of said splined surface, adapted to be seated in said resilient bushings, said bar terminating at each end in a threaded portion, securing means threadedly engaging said threaded portions, said bushing extending radially between said journal and said rod and longitudinally between said rod and said journal and said securing means and said journal.

HENRY FORD.
EMORY NADOR.

REFERENCES CITED

The following references are of record in the file of this patent:

UNITED STATES PATENTS

| Number | Name | Date |
| --- | --- | --- |
| 418,650 | Medart | Dec. 31, 1889 |
| 1,156,909 | Koeb et al. | Oct. 19, 1915 |
| 2,083,085 | Palmer | June 8, 1937 |
| 2,123,335 | Herreshoff | July 12, 1938 |
| 2,208,538 | Brown | July 16, 1940 |
| 2,219,140 | Olsen | Oct. 22, 1940 |
| 2,236,868 | Cook | Apr. 1, 1941 |